United States Patent
Ramalingam et al.

(10) Patent No.: US 10,567,325 B2
(45) Date of Patent: Feb. 18, 2020

(54) SYSTEM AND METHOD FOR EMAIL MESSAGE FOLLOWING FROM A USER'S INBOX

(71) Applicant: OATH INC., New York, NY (US)

(72) Inventors: Janarthanam Ramalingam, Santa Clara, CA (US); Sudharsan Vasudevan, Santa Clara, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/271,942

(22) Filed: Feb. 11, 2019

(65) Prior Publication Data

US 2019/0173825 A1  Jun. 6, 2019

Related U.S. Application Data

(63) Continuation of application No. 15/878,593, filed on Jan. 24, 2018, now Pat. No. 10,212,117, which is a continuation of application No. 14/492,708, filed on Sep. 22, 2014, now Pat. No. 9,894,025.

(51) Int. Cl.
  *G06F 15/16* (2006.01)
  *H04L 12/58* (2006.01)
  *G06F 16/2455* (2019.01)

(52) U.S. Cl.
  CPC .............. *H04L 51/22* (2013.01); *H04L 51/04* (2013.01); *H04L 51/10* (2013.01); *G06F 16/24565* (2019.01); *H04L 51/16* (2013.01)

(58) Field of Classification Search
  CPC .......... H04L 51/04; H04L 51/10; H04L 51/22
  See application file for complete search history.

(56) References Cited

U.S. PATENT DOCUMENTS

| | | | |
|---|---|---|---|
| 8,631,076 B1 | 1/2014 | Auerbach et al. | |
| 9,894,025 B2 * | 2/2018 | Ramalingam | H04L 51/22 |
| 2005/0222985 A1 | 10/2005 | Buchheit et al. | |
| 2008/0147795 A1 | 6/2008 | Heidloff et al. | |
| 2010/0115033 A1 | 5/2010 | Geffner et al. | |
| 2014/0325028 A1 | 10/2014 | Jiang | |
| 2015/0106741 A1 | 4/2015 | Friend et al. | |
| 2015/0281161 A1 | 10/2015 | Costecalde et al. | |
| 2015/0332332 A1 | 11/2015 | Al Darmaki | |
| 2016/0378756 A1 | 12/2016 | Kemp et al. | |

* cited by examiner

*Primary Examiner* — Yves Dalencourt
(74) *Attorney, Agent, or Firm* — James J. DeCarlo; Greenberg Traurig, LLP

(57) ABSTRACT

Disclosed is a system and method for email management. The disclosed systems and methods enable a user to follow messages and message conversations based on, but not limited to, a context of the received messages, content included in the messages, the sender of the messages, intended recipients of the message, and the like. Therefore, the present disclosure describes systems and methods for enabling a recipient user to follow messages, topics or other users from the recipient user's inbox. Accordingly, followed topics or messages from followed users can be grouped into message conversations within the recipient user's inbox. Whenever there is an update in a followed conversation, the recipient user will be notified. By determining which messages a user desires to follow, the disclosed systems and methods can identify the interests of users by leveraging information from the followed messages for advertising purposes.

20 Claims, 7 Drawing Sheets

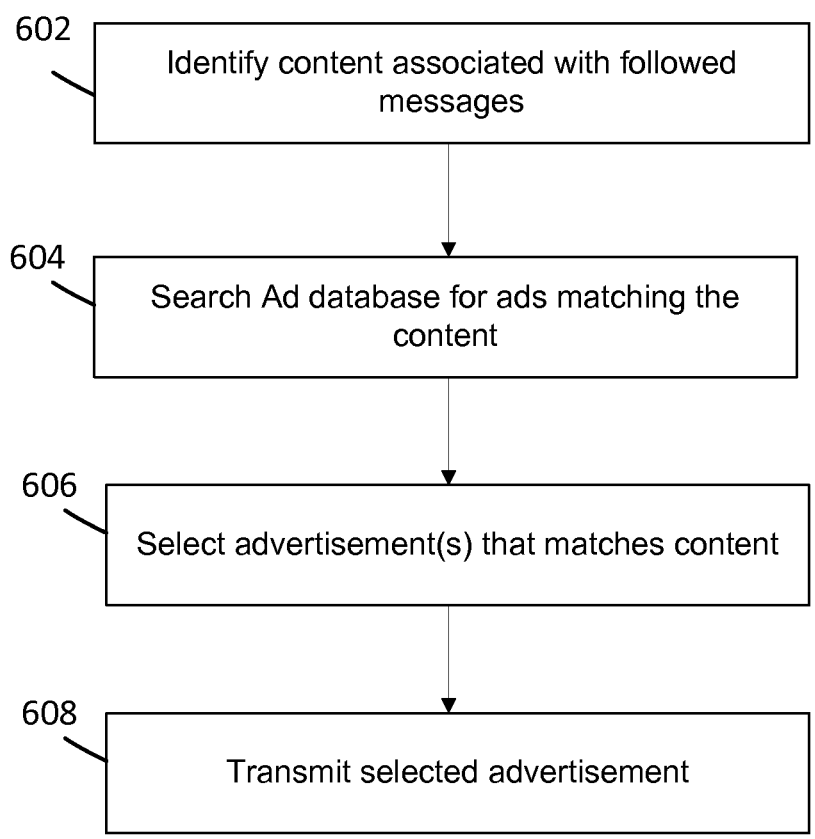

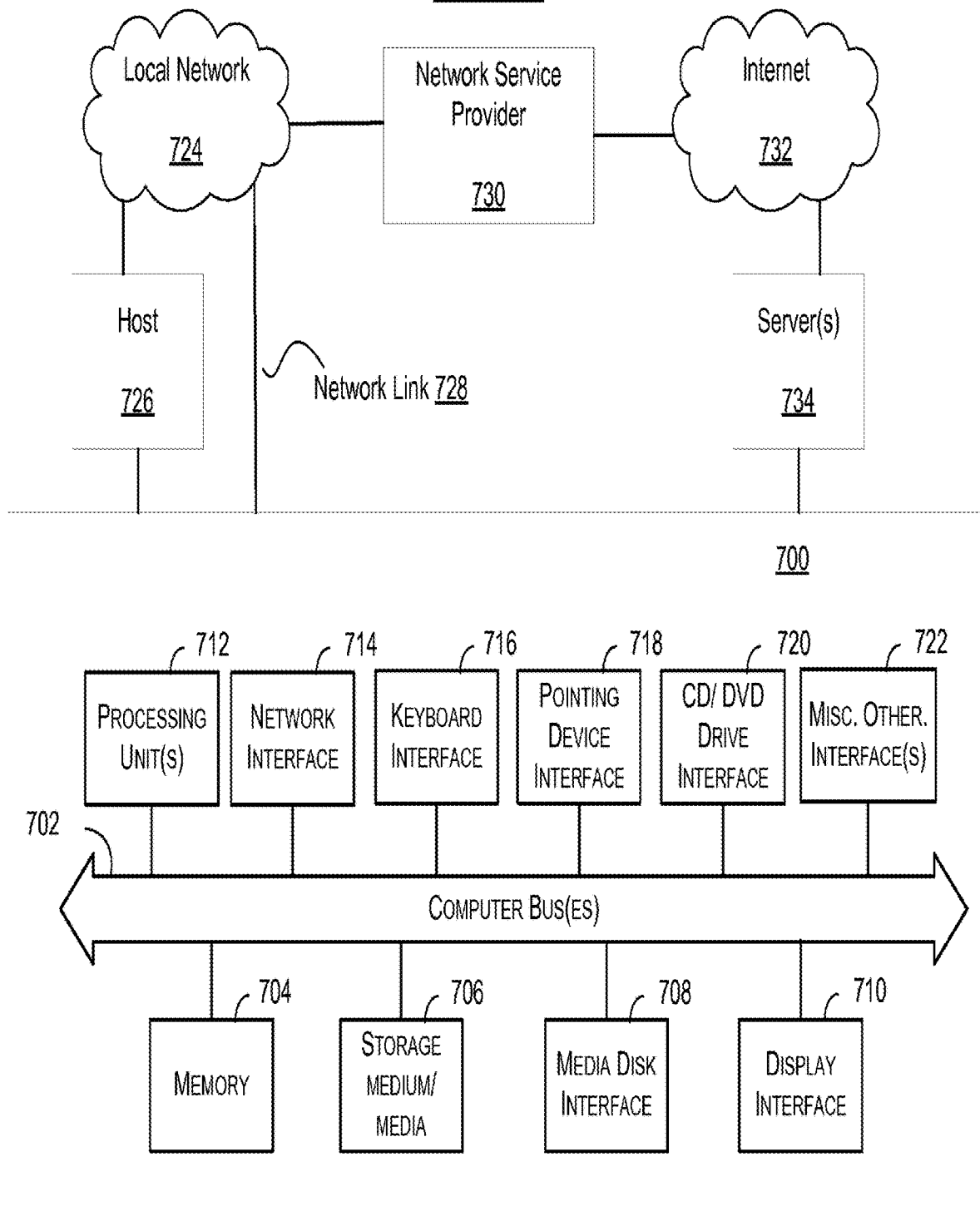

SYSTEM AND METHOD FOR EMAIL MESSAGE FOLLOWING FROM A USER'S INBOX

CROSS REFERENCE TO RELATED APPLICATION

This application is a continuation of, and claims priority from U.S. patent application Ser. No. 15/878,593, filed on Jan. 24, 2018, which is a continuation of U.S. patent application Ser. No. 14/492,708, filed on Sep. 22, 2014, now U.S. Pat. No. 9,894,025, which are both incorporated herein by reference in their entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to email management, and more particularly towards systems and methods that enable a user to follow message activity including message conversations directly from the user's inbox.

RELATED ART

Electronic mail ("email") has become omnipresent in everyday use for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, current and customers, and the like.

SUMMARY

The disclosed systems and methods focus upon email management that enables a user to follow messages and message conversations directly from the user's inbox based on, but not limited to, a context of the received messages, content included in the messages, the sender of the messages, intended recipients of the message, among other types of information associated with or comprised within received messages. Thus, the present disclosure describes systems and methods for enabling a recipient user to "follow" messages, topics, or other users from the recipient user's inbox. Accordingly, followed messages can be categorized or grouped into message conversations within the recipient user's inbox. Therefore, whenever there is an update in a followed conversation, the recipient user will be notified. As discussed in more detail below, such notification can include the recipient user receiving an alert or other type of notification signifying that a followed conversation has been updated. Such notification can be realized in the user's inbox through dedicated tags applied to messages or displays associated with followed conversations, or through a specified viewing screen, portion, area or folder within the user's inbox, which can alert the user to such updates, as discussed in more detail below. By determining which messages a user desires to follow, the disclosed systems and methods can identify the interests of users by leveraging information from the followed messages for advertising purposes.

In accordance with one or more embodiments, a method is disclosed which includes receiving, at a computing device, an instruction to follow a message conversation from a message inbox of a user, said follow instruction comprising follow criteria associated with a message context; analyzing, via the computing device, message data associated with an incoming message addressed to the user, said analysis comprising comparing said message data to said follow criteria; determining, via the computing device, whether at least a portion of said message data satisfies said follow criteria based on said comparison; generating, via the computing device, a notification for display in said inbox based on said satisfaction of said follow criteria, said notification indicating to said user that said message conversation has received an updated thread; and delivering, via the computing device, said incoming message for display in said inbox, wherein said delivery facilitates display of said incoming message in a follow section of said inbox.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method that enable a user to follow message activity including message conversations from the user's inbox.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a flowchart illustrating steps performed in accordance with some embodiments of the present disclosure; and FIG. 7 is a block diagram illustrating architecture of a hardware device in accordance with one or more embodiments of the present disclosure.

DESCRIPTION OF EMBODIMENTS

Figure 1:
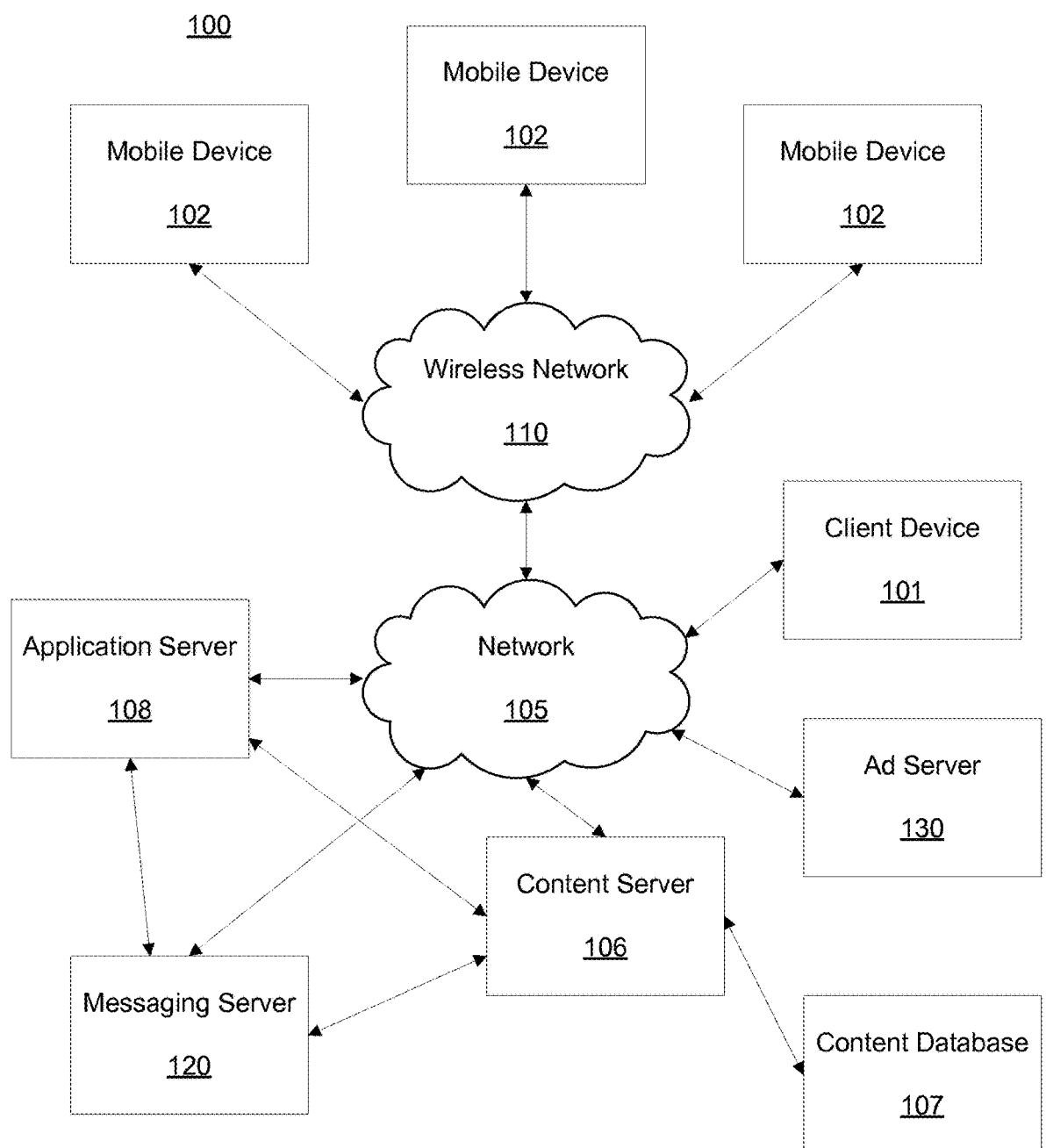
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes or compasses, global positioning system (GPS) or other position and or location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, email usage has led to an explosion of email messages being received in user's inboxes. As a result, this has led to an increase in user's missing out on messages that are of interest or are of particular importance to a user. Conventional systems attempt to remedy this by simply categorizing or grouping messages; however, this fails to address the issue of highlighting messages, content and/or message conversations a recipient user desires to remain on top of. The present disclosure addresses these shortcomings by providing systems and methods that afford users the ability to follow particular messages from his/her inbox, whether the message is sent from a specific recipient, directed towards or including particular content, or other criteria determined to be of interest to the recipient.

According to some embodiments, the disclosed systems and methods are directed to email management by providing a user, from the user's inbox, the ability to follow messages, topics or other users' message activity. That is, in response to receiving a message, the recipient user can "follow" the subsequent messages associated with or related to the initial message. The ability to follow a message or topic, for purposes of this disclosure, includes receiving notifications or alerts upon receiving subsequent communications that are deemed associated with an initial message, as understood by those of skill in the art. For example, Twitter® enables users to follow other users. The present disclosure enables users to follow email message conversations from his/her inbox, a novel aspect of email management that is absent from conventional messaging systems.

In accordance with the present disclosure, communications can be followed based on determinations that they are related to or associated with one another. Such associations are based upon follow criteria for an individual user. Follow criteria sets the context for which message conversations are to be followed. Follow criteria, according to some embodiments, can be set by the user. That is, for example, a user can select to follow a message or conversation via user input, where the user selects a message thread and indicates that associated messages (the message conversation) are to be followed. The user can also select another user's contact information (email address), which would provide a follow instruction to follow messages received from that particular user. Therefore, follow criteria, for messages in the user's inbox or contact information in the user's inbox account, can be set by a user via user input or search, user defined rules, filters and/or preferences.

According to some embodiments, follow criteria can be automatically determined based on the user's activity or messaging behavior in connection with his/her inbox. As such, follow criteria can be based on, but not limited to, a sender of the message, information associated with intended recipient(s) of the message (e.g., if the message is sent to a group), a topic of the message, context of the message, content of the message, a message template format or information within the message template, temporal data associated with a message, social data associated with the message, spatial data associated with the message, and the like.

Therefore, upon receiving a message, a determination is made regarding whether the message satisfies the follow criteria. As discussed in more detail below, such determinations can be made upon the user opening his/her message application or page displaying the user's inbox, or upon the message application being responsive to a push, pull or fetch instruction in connection with new message application data. Thus, when subsequent messages are determined to satisfy or match the follow criteria, the user will be able to follow such messages.

According to embodiments of the present disclosure, followed messages can be grouped into message conversations within the recipient's inbox. This enables the user to view each followed message conversation. Indeed, whenever there is an update in the followed conversation, or a new mail message received that satisfies the follow criteria, the follower (i.e., recipient user) will be notified. That is, according to some embodiments, following messages from the user's inbox can result in the user receiving an alert or notification. For example, a notification can include the recipient user receiving an alert or other type of notification signifying that a followed conversation has been updated.

Figure 5:
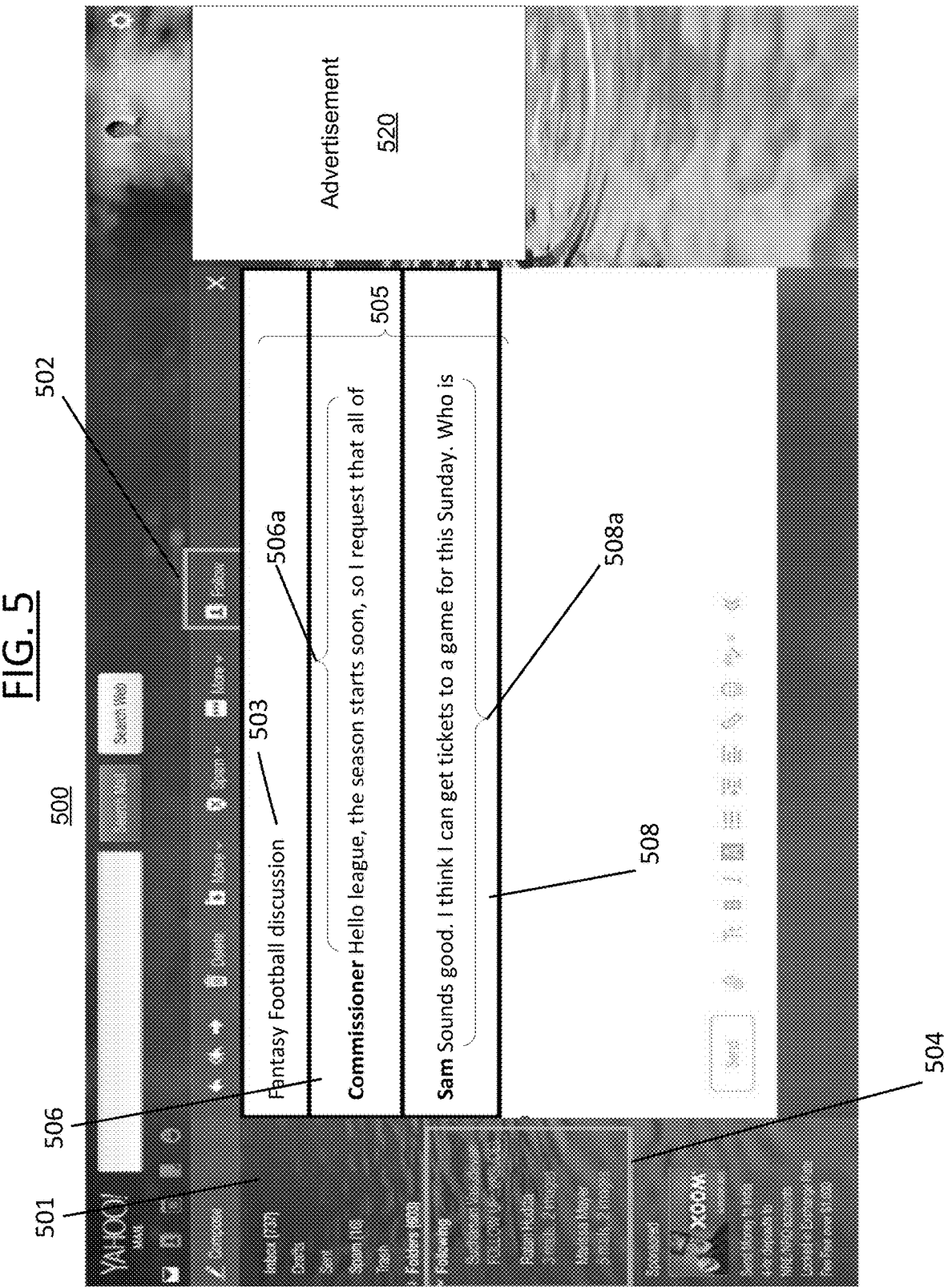
FIG. 5 illustrates a non-limiting example embodiment of message following in accordance with some embodiments of the present disclosure.

According to some embodiments, reception of an updated message to a followed message can result in the updated message conversation being categorized and displayed in a dedicated "follow" view, portion, area, tab or folder in the user's inbox, as illustrated in FIG. 5 and discussed in more detail below. Therefore, such notifications can be realized in the user's inbox through dedicated tags applied to messages (which can indicate which conversation or follow criteria is satisfied) or displays associated with followed conversations, and/or through a specified view screen, portion, area, tab or folder of the user's inbox, which can alert the user to such updates, as discussed in more detail below.

By determining which messages, and as a result which content, a user desires to follow, the disclosed systems and methods can identify the interests of users by leveraging information from the followed messages for advertising purposes. That is, the present disclosure enables the determination of content from followed message conversations for monetization purposes, where targeted advertisements can be served based upon the data (e.g., content) from such messages.

By way of a non-limiting example, user Bob desires to follow messages from his wife Jill. According to some embodiments, as mentioned above and discussed in more detail below, Bob can locate and select Jill's email address in order to signify that he desires to follow her emails. According to some embodiments, as discussed above, Bob can locate an already received email from Jill in his inbox and provide a user input in connection with her email address indicating that he would like to follow messages received from her. In some embodiments, Bob can perform a search within his contacts to locate Jill's email address, and provide the input in connection with her address thereby triggering a follow instruction of her emails. Therefore, from such instruction received from Bob, Jill's email address can be set as the follow criteria for Bob's email inbox. As discussed in more detail below, this information is saved in a data store associated with Bob's email platform provider for analysis of subsequent messages. From here, any email message conversations sent between Bob and Jill will be classified as being followed. That is, any time Bob receives a message from Jill, Bob will be alerted to the new message.

For example, when a new message from Jill arrives, the message can be routed to a separate follow view area within Bob's inbox, as illustrated in FIG. 5. Upon displaying the message conversations between Bob and Jill, each new message alert in the follow view section will include a message summary (or snippet). For example, the first n number of characters in the new message thread from Jill that satisfies a threshold can be displayed so that Bob can readily view at least a portion of the message without having to open the message.

Embodiments exist where the message may also (or alternatively) be delivered to Bob's inbox with a tag denoting that the message satisfies specific follow criteria (or is part of a followed conversation). Such tag can be displayed in connection with the new message thread or as an indicator that an entire message has been updated with a new thread. Such indicators will be discussed in more detail below in connection with FIG. 5.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components (or order of steps) may be made without departing from the spirit or scope of the disclosure.

As shown, system 100 of FIG. 1 includes local area networks ("LANs")/wide area networks ("WANs")–network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like.

Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, other content or information available on or via the network 103, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as a messaging/email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server or ad platform that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" or ad platforms may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, and all other known or to be known types of messaging servers, in addition to, photo-sharing services servers, and travel services servers, via the network 105 using their various devices 101-102. In some embodiments, applications, such as a photo-sharing or viewing application (e.g., Flickr®, Instagram®, and the like), can be hosted by the application server 108. Thus, the application server 108 can store various types of applications and application related information including application data and user profile information.

In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
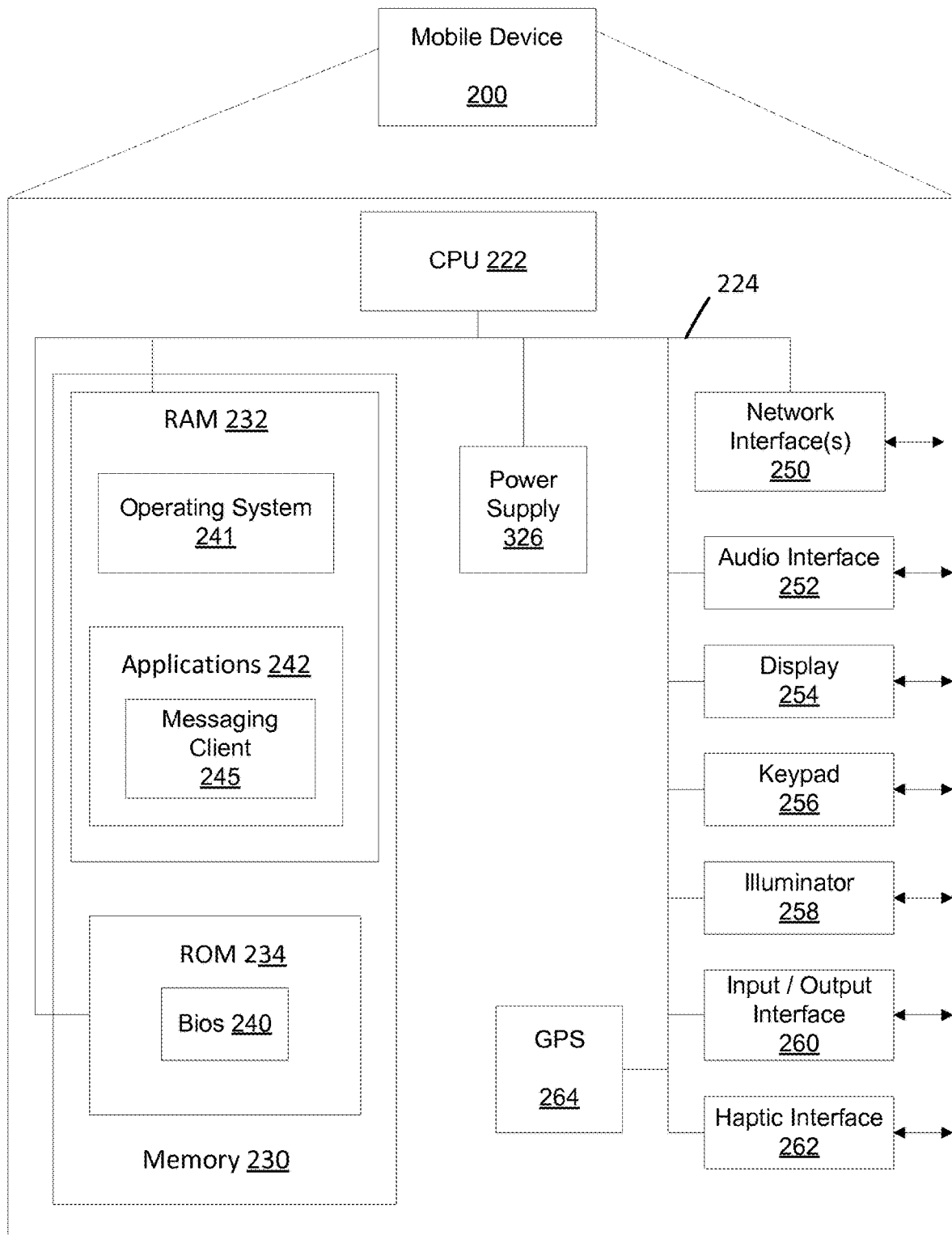
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within a client device.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described.

Figure 3:
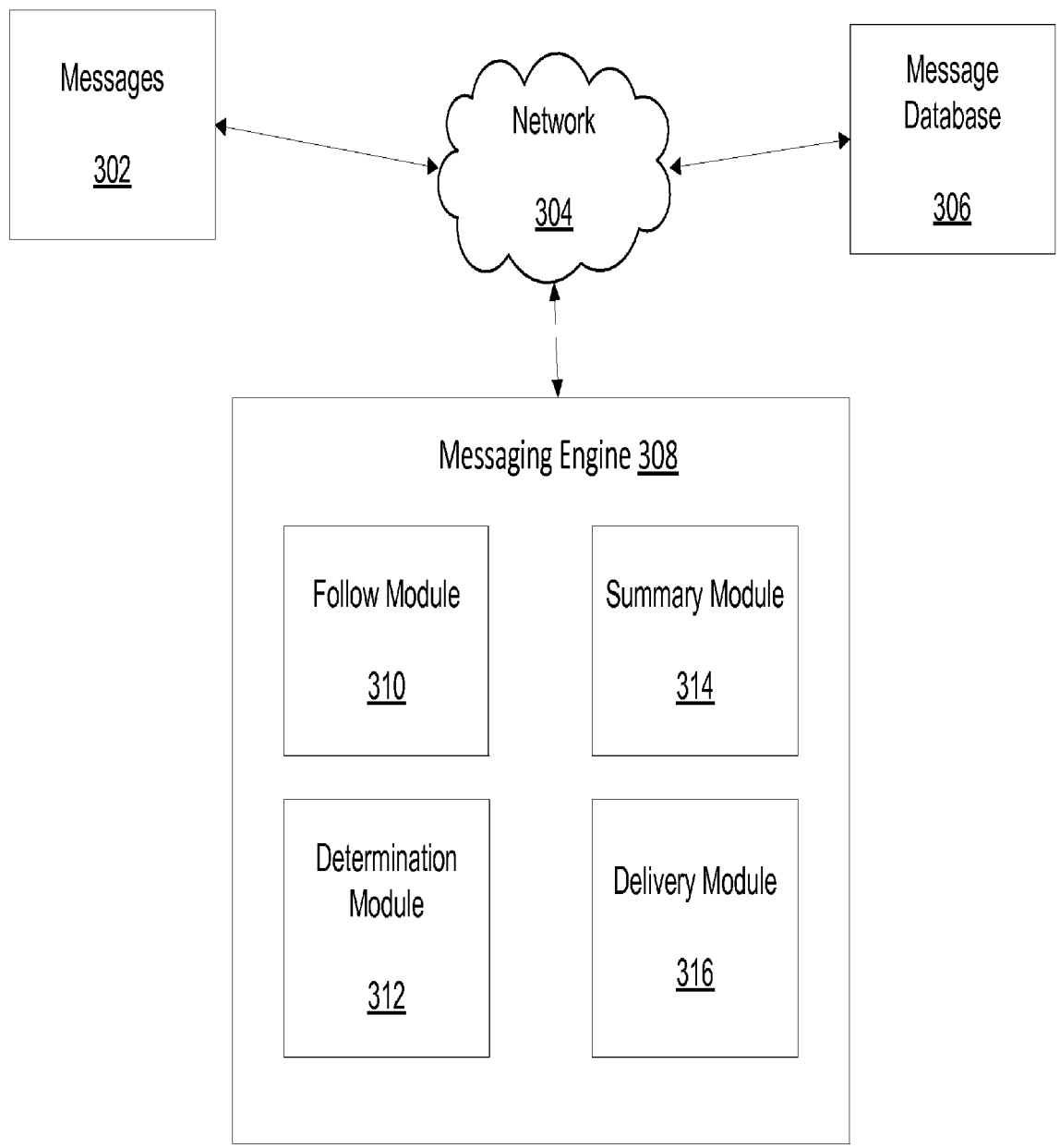
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing messages. The message engine 308 could be hosted by a web server, content provider, email service provider, ad server, a user's computing device, or any combination thereof. The plurality of messages 302 can be any type of message. Examples of such messages 302 can include email messages, HTML forms, social networking messages or notifications, comments to an article or website, online forum posts/entries, word processing documents, help desk messages, portable document format (PDF) documents and/or other types of documents. The messages 302 can be provided to the message engine 308 or accessed by a computer program or device that can access the messages. In some embodiments, the messages 302 can be stored in a database of stored messages 306, which is associated with an email provider, such as Yahoo! Mail®. The database 306 can be any type of database or memory that can store the messages 302 and associated follow criteria, as discussed herein. For purposes of the present disclosure, email messages as a whole are discussed within some embodiments; however, it should not be construed to limit the applications of the systems and methods discussed herein. Indeed, while reference is made throughout the instant disclosure to email or mail messages, other forms of electronic documents or transmissions (e.g., Short Message Service (SMS) messages, Multi-media Message Service (MMS) messages, tweets, posts and the like) can be received and/or accessed and processed by the message engine 308 according to the disclosed systems and methods.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

The message engine 308 includes a follow module 310, determination module 312, summary module 314 and delivery module 316. It should be understood that the engine(s) and modules discussed herein are non-exhaustive, as additional or fewer engines and/or modules, or sub-engines or sub-modules may be applicable to the embodiments of the systems and methods discussed. The operations, configurations and functionalities of each module, and their role within embodiments of the present disclosure will be discussed with reference to FIG. 4, whereby the components of system 300 are implemented to perform the steps of process 400.

Figure 4:
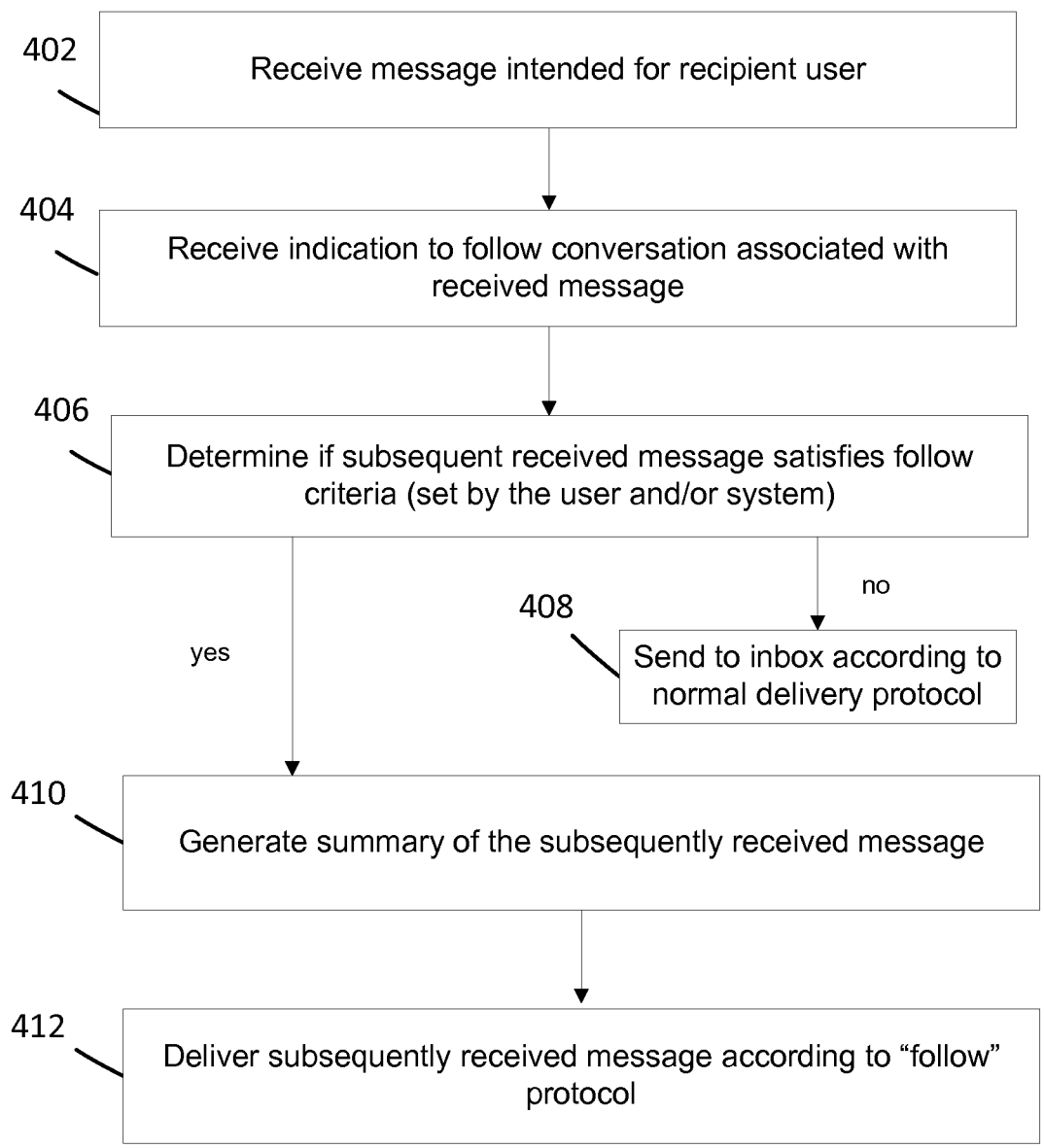
FIG. 4 is a flowchart illustrating steps performed in accordance with some embodiments of the present disclosure.

FIG. 4 is a process 400 diagram illustrating steps performed in accordance with embodiments of the present disclosure. As discussed above, the present disclosure involves enabling a user to follow messages and message conversations directly from his/her inbox based on, but not limited to, a context of the received messages, content included in the messages, the sender of the messages, intended recipients of the message, and the like. Indeed, whether the user is viewing his/her inbox in a web-based application or in an email application on a mobile device, the user will be able to follow message activity according to the systems and methods discussed herein. Process 400 discusses, inter alia, a method for a recipient user to follow messages, topics or other users from within the recipient user's inbox, such that whenever a new message associated with a followed conversation (i.e., satisfying a follow criteria) is received (or detected), the user is notified, and the updated conversation is available for viewing from within the recipient user's inbox.

While discussing FIG. 4, FIG. 5 will also be referenced to convey the features and steps discussed in relation to Process 400. FIG. 5 illustrates a non-limiting example of a follow email embodiment which illustrates a notification view upon a user receiving a followed email. FIG. 5 depicts follow inbox 500, which is in itself an inbox section of the main inbox associated with a user's message account. According to some embodiments, follow inbox 500 can also be a folder view with respect to the user's inbox. Follow inbox 500 is associated with the user's main inbox, and is accessible through a user interface element such as for example the follow tab 502. Follow inbox 500 is also accessible through a user action in connection with follow inbox portion 504 associated with a user's inbox panel or portion 501. Thus, through a user action, such as an input selection of tab 502 or an item listed in portion 504, a user can view his/her follow inbox 500. As discussed in more detail below, follow inbox portion 504 is displayed within the inbox panel 501 of a user's email platform user interface (UI). Typically, this UI portion 501 displays folders associated with a user's inbox account, such as, his/her main inbox folder, a drafts folder, sent mail folder, spam folder, trash folder, and the like. The follow inbox portion 504 (or folder), as illustrated in FIG. 5, shows that identifiers for followed messages can be displayed.

For example, portion 504 shows that there are three (3) conversations being followed, and the indicator for each conversation can provide which follow criteria triggered such conversations to be followed. For example, the follow inbox portion 504 shows that the user is following mails from "Marissa Mayer" (where her email address could have been the follow criteria); therefore, as indicated in the portion 504, "Marissa Mayer" is listed as a header for the conversation in the folder view of portion 504. Also, under the listing, portion 504 can show how many mails have been received for the followed conversation and types of content objects that are associated with the conversation. As with the "Marissa Mayer" example illustrated in FIG. 5, there have been 5 mails, which include 2 images within the messages. It should be understood that the information displayed in the portion 504 is not limited to what is discussed above and illustrated in FIG. 5, as any type of identifying information can be displayed in the portion 504, such that, the viewing user of the portion 504 within the user's mail UI will be able discern activity related to followed message activity. Further discussion of this is disclosed in more detail below from the discussion of Process 400 and the below examples.

FIG. 5 also illustrates an example that, within the follow inbox 500, a message conversation 505 includes two messages 506 and 508. Additionally, the title 503 of the message conversation 505 can be displayed. As discussed in more detail below, these messages can have displayed summaries (or snippets), 506*a* and 508*a*, respectively. According to some embodiments, the conversation 505 will display the messages as unopened, and in some embodiments, the messages can be displayed as opened, or some combination thereof. Additionally, an advertisement 520 associated with the followed conversations can be displayed, as discussed in more detail below.

By way of a non-limiting example, for purposes of explaining Process 400 in connection with FIG. 5, user Jim receives a message in his inbox. The message is related to fantasy football and is sent from the commissioner of his fantasy football league. The recipients on the message include Jim, in addition to the other 10 users in the league (the eleventh user being the sender of the message). Therefore, Jim would like to follow this message, as the sender of the message, recipients of the message, content of the message and topic of the message are all of interest to Jim.

As discussed above, follow criteria can include information associated with a sender of the message, information associated with intended recipient(s) of the message (e.g., if the message is sent to a group), a topic of the message, title of the message, context of the message, content of the message, a message template format or information within the message template, temporal data associated with a message, social data associated with the message, spatial data associated with the message, and the like.

Thus, for example, Jim can open the message, select the sender's email address and set such address as the follow criteria. In some embodiments, Jim can perform a similar action for any or all of the recipients' email addresses. In some embodiments, Jim can select the message title as the follow criteria. Jim can also simply select the message as a whole and set the message as the follow criteria. The above actions can be performed with or without opening the message. As such, based on the above follow criteria set by Jim, anytime another message is received that is determined to relate to the initial message (as part of a message thread or chain), Jim will be alerted to its arrival in his inbox. In other words, messages in the message conversation or thread can be identified as part of a message conversation that Jim has indicated he intends to follow.

For example, if Jim sets the sender's email address as the follow criteria, anytime the sender sends a message within the email conversation associated with the initial message, Jim will be alerted to its arrival in his inbox. However, since Jim set the sender's email address as the follow criteria in the context of the fantasy football email chain, when the sender sends Jim another unrelated message, Jim may not be identified, unless Jim sets other criteria for such an alert, or augments the initial criteria with a broader set of criteria. Thus for example Jim could receive a message from a sender concerning fantasy football, and a subsequent message from the same sender about a flat tire. If Jim has set the follow criteria for all sender's messages, Jim will see both in his follow messages, but if Jim set the criteria to the sender and fantasy football, the flat tire message would not appear.

According to some embodiments, despite Jim only setting the sender's email address as the follow criteria, Jim could also be alerted to new threads in the fantasy football conversation when such threads are sent from one of the initial recipients. That is, for example, recipient Sam is also on the initial fantasy football email and despite Jim only indicating the sender's address as the follow criteria, Jim can be alerted to Sam's response to the initial email because the initial sender is now a recipient of Sam's email. As such, it should be understood that follow criteria set by a user can apply to all messages within a message conversation (or message chain or thread).

According to some embodiments, the follow criteria need not be set through direct input by Jim. That is, it can be determined that Jim is heavily involved in communications with particular users (e.g., users in the fantasy football league) or communications dealing with a particular context. As such, the messaging platform (e.g., Yahoo! Mail®) can apply any known or to be known data mining, machine learning algorithm, text parser or user behavior algorithms(s) to determine that Jim's activities showcase a desire for Jim to be alerted to such messages. From the above example, since Jim typically has heavy email traffic with a particular set of users from September to January each year (i.e., football season), and/or such messages are related to fantasy football (which was determined to be of interested to Jim), the messaging platform can set such derived information (message data) as follow criteria for Jim, which can be set by the system alone or in addition to Jim's selected criteria, or just those criteria set by Jim can be used.

Thus, continuing with the above example, Jim has set the follow criteria to be applied to incoming messages, such that when messages in the fantasy football message conversation are received, Jim is to be alerted. As illustrated in FIG. 5, such alerts can be effectuated through display of the message in the follow inbox 500, which displays conversation 505, or within a follow inbox portion 504 associated with Jim's inbox panel 501. As discussed above, the follow inbox portion 504 can indicate how many messages are received for a particular conversation that is being followed and/or other information associated with followed messages. That is, each message conversation that is being followed has specific denoted follow criteria, and can be separately viewed in a portion of Jim's inbox—the follow inbox 500, as illustrated in FIG. 5 and discussed above. Thus, the message is delivered according to follow protocol detailed in relation to Process 400. If the messages are not related to the fantasy football conversation (do not satisfy follow criteria), then the message is delivered to Jim's inbox according to normal protocol.

Taking into account the above example, Process 400 will be discussed detailing the steps for initiating following a message and delivering a followed message to a user's inbox according to follow protocol. Process 400 begins with Step 402 where a message intended for a recipient user is received. In accordance embodiments of the present disclosure, the message reception is performed by a message platform, for example, Yahoo! Mail®, and such messages are stored in storage 306.

In Step 404, an indication is received that provides an instruction to the message platform (i.e., messaging engine 300) to follow any subsequent messages that are related to the initial message (where the initial message is the message that is the launching point for the follow indication—whether it is a newly received message or message that has been previously received in the recipient user's inbox). That is, follow criteria can be set based on a newly received message in a new message conversation, or in an existing conversation, where based upon at least one thread previously received in a conversation, such conversation is requested to be followed through designation of follow criteria. Step 404 is performed by the follow module 310.

According to some embodiments, follow criteria can be set without the need for a received message. That is, as described above, a user can select another user's contact information (email address) from the user's contacts; or can input an email address to follow via a text entry. Such selection/entry would provide a follow instruction to follow messages received from that particular user. According to some embodiments, such selection can occur automatically by the message platform analyzing the user's inbox and/or the user's messaging behavior, and determining that a contact is, or has been frequently contacted at or above a threshold. Therefore, follow criteria, for messages in the user's inbox or contact information of particular users, can be set by a user via user input or search of the user's inbox, user defined rules, filters and/or preferences. Indeed, follow criteria can be automatically determined based on the user's activity or messaging behavior in connection with his/her inbox.

As discussed above, follow criteria denotes the context for which message conversations are to be followed. The follow criteria can be associated with particular users (i.e., their email addresses) or with message conversations. Therefore, the follow criteria can be stored in storage 306. The follow criteria can be stored accordance with the message conversations from which it is derived or associated. Thus, such storage information can entail the follow criteria, message data, context of the message, content associated with the message, and the contact information of the sender(s) and recipient(s). In some embodiments, the follow criteria, especially when associated with a particular content or content type, can be used for monetization purposes, where targeted advertisements can be served based upon the data (e.g., content) identified from followed messages, as discussed in more detail below in FIG. 6.

In Step 406, a determination is made regarding whether subsequent messages intended for the user satisfy the follow criteria. Step 406 is performed by the determination module 312. According to some embodiments, such determination can occur at the messaging server 120 prior to delivery to the user's inbox. In some embodiments, the determination can occur upon delivery of the message to the user's inbox. According to some embodiments, the determination in Step 406 may only occur upon a user opening his/her messaging application or visiting the location (e.g. URL or web page) hosting a web-based messaging platform. In some embodiments, the determination in Step 406 may only occur periodically according to a predetermined time period (set by the user, system or messaging provider). In some embodiments, determination in Step 406 may only occur in accordance with a push, pull or fetch step implemented in accordance with the messaging platform upon attempting to retrieve and/or deliver messages.

Step 406 involves monitoring incoming messages based on the follow criteria. That is, Step 406 involves analyzing message data associated with received messages, and determining if at least a portion of (or any) message data coincides with the follow criteria. For example, message data can include, but is not limited to, content of the message (in the message body), the title of the message, intended recipients of the message and the sender of the message, date and time of reception, message metadata or any of the above alone or in multiple combinations. Thus, such message data is parsed, analyzed and compared against the follow criteria (set by the system and/or user), and the determination in Step 406 is performed. Such parsing, analyzing and comparing can be done in accordance with known or to become known data analysis techniques such as, but not limited to, top-down parsers, bottom-up parsers, recursive parsers, comparison generators, and the like.

If the message data associated with an incoming message is determined not to coincide, match, relate to, or satisfy the follow criteria, then the message is delivered (and displayed) in the user's inbox according to known protocol. Step 408. That is, the message can be delivered to the user's inbox according to the protocol associated with the messaging platform, operating system and/or device the user is utilizing according to known methods and techniques.

If at least a portion of the message data is determined to meet the follow criteria, that is, the message is determined to be a message, of a message type, contain content or be associated with a message conversation that the user has indicated as desiring to follow, then a message summary (or snippet or preview) is generated for the incoming message. Step 410. Generation of the summary (or snippet) is performed by the summary module 314. A message summary or snippet is generated based on the message data associated with the content of the message. According to some embodiments, the message data associated with the content of the message is extracted and displayed as the snippet in accordance with the summary threshold, as discussed herein. The message summary provides a snippet 508a (or preview) of the content in the received message, as illustrated in items 506a and 508a of FIG. 5. According to some embodiments, the first n number of characters in the new (or received)

message that at least meets a summary threshold is identified. The threshold can be related to the amount of characters able to be displayed in within the preview section of a displayed email. Accordingly, any known or to be known method for generating and displaying a message snippet is applicable to the disclosed systems and methods. According to some embodiments, the snippet or preview can be displayed to the user within the user's inbox, within the user's follow inbox 500, or as a preview of the message, or other known or to be known methods of providing previews for messages.

In Step 412, the received message, which is determined to satisfy the follow criteria, is delivered to the recipient user according to follow protocol, which is discussed herein. Delivery of the message is performed by the delivery module 316. As discussed above, the delivery of the message includes displaying the message as a new message thread 508 (with displayed snippet 508a) within the message conversation 505. (Note, as displayed, item 506 illustrates a first message in the conversation 505 having displayed snippet 506a, and message 508 represents a subsequent message deemed to have satisfied the follow criteria, as discussed herein).

According to some embodiments, the delivery of Step 412 includes delivering the message solely for display in a follow inbox 500. As discussed above, the follow inbox 500 is associated with the user's main inbox provided by the messaging platform, and access, loading or display of the follow inbox 500 can be effectuated by the user selecting the tab 502, or clicking on any of the items in the follow inbox portion 504, which provides notifications/alerts as to how many updates have occurred responsive to followed messages for the user, what the updates includes (such as, how many messages are in a followed conversation and what type of content is included in the conversation), and/or other types of information, such as, but not limited to, the title of a followed conversation. According to some embodiments, the delivery of Step 412 can include delivering the message to the user's inbox, as with standard emails—the main inbox of the user's account, as well as (or in addition) to the follow inbox 500.

According to some embodiments, upon receiving a message associated with a followed conversation (or context), the user will be immediately taken to the new unread message upon loading the messaging platform. This can occur across operating systems, devices and messaging platforms. For example, when opening a user's messaging application on a mobile device, the newly received messages that are part of followed conversations will be immediately displayed. In another example, upon signing into to Yahoo! Mail® on a personal computer, the user can immediately view emails from sender's the user has followed. The above two (2) examples result in the user immediately being presented with the follow inbox 500.

FIG. 6 is a work flow illustrating a process 600 for serving relevant advertisements based on followed messages. Specifically, FIG. 6 illustrates how advertisements are served to recipients of messages based on the content of followed messages. In Step 602, content associated with a followed message conversation is identified. That is, message data associated with content of followed message conversations is compiled, and this content, forms a basis for a context for serving advertisements having a similar context. For example, the content can be related to the content included in the message body, title of the messages or one message, and the like. Such content is identifiable from the message data associated with each message, as discussed above. In Step 604, the content (or content data) is communicated (or shared) from the email platform to an ad platform, which can include an advertisement server 130 and an associated advertisement database. Upon receipt of the content data, the advertisement server 130 performs a search for a relevant advertisement within the associated advertisement database. The search for an advertisement is based at least on the identified content.

In Step 604, the advertisement server 130 searches the advertisement database for advertisements that relate to (or match) the identified content. In Step 606, an advertisement(s) is selected (or retrieved) based on the results of Step 604. In some embodiments, the advertisement(s) can be selected based upon the result of Step 604, and modified to conform to attributes of the page or inbox upon which the advertisement will be displayed, and/or to the operating system or device for which it will be displayed. In some embodiments, as in Step 608, the selected advertisement(s) is shared or communicated via the email platform. In some alternative embodiments, the selected advertisement is sent directly to each user's computing device. As such, as illustrated in FIG. 5, the transmitted advertisement, advertisement 520, can be displayed in connection with a user's email inbox, for example, the follow inbox 500. In some embodiments, the advertisement 520 may be displayed in association with a folder of the user's inbox, within a body of a message, within a snippet/preview of a thread 508 or any other portion of a message conversation or user interface area of a message application's graphical user interface.

By way of a non-limiting example, using the example above of Jim following messages related to fantasy football, the message data of the followed messages (or message conversation 505) could include content data related to fantasy football or football. That is, the message data of the followed conversation (e.g., item 505 in FIG. 5), includes message data for each followed message (e.g., items 506 and 508 in FIG. 5) within the conversation 505. Therefore, advertisement 520 could be served to Jim's inbox for display within the follow inbox 500, where advertisement could be related to football tickets (derived from message data of message 508), discounts on fantasy football leagues (derived from message data from the title 503 and/or message 506), and the like. Additionally, embodiments exist where the advertisement may change for the latest received message. That is, using FIG. 5 as an illustrative example, when message 506 is received, the advertisement 520 may be based on content data for that message. For example, the ad 520 could be related to fantasy football. Then, when message 508 is received, the ad 520 could change based on the content data of that message. For example, if message 508 discusses attending a game that following Sunday, another ad 520 may be displayed related to a coupon for tickets to a football game.

As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a server, an instruction to follow a message conversation and each update of the conversation from a message inbox of a user, said follow instruction comprising follow criteria associated with a message context of the conversation;
   analyzing, via the server, message data associated with an incoming message addressed to the user, said analysis comprising comparing said message data to said follow criteria;
   determining, via the server, whether at least a portion of said message data satisfies said follow criteria based on said comparison;
   upon determining that at least said portion satisfies said follow criteria, retrieving, via the server, supplemental digital content corresponding to said message context and said message data;
   modifying, via the server, said incoming message based on said retrieved supplemental digital content such that said supplemental digital content is included within said modified message; and
   delivering, via the server, said modified message for display in said inbox in association with said message conversation, said delivery facilitates display of said modified message in a follow section of said inbox.

2. The method of claim 1, further comprising:
   modifying each of the messages in said message conversation to include said supplemental digital content.

3. The method of claim 1, further comprising:
   determining an attribute of the message data;
   retrieving an updated version of the supplemental content; and
   updating said modified message to replace said supplemental content with said updated version.

4. The method of claim 1, further comprising:
   analyzing message data associated with each message in said message conversation, said analysis comprising comparing said message data to said follow criteria;
   identifying a set of messages from within said message conversation that has corresponding message data satisfying said follow criteria;
   retrieving supplemental digital content corresponding to each message in said set of messages;
   modifying each message based on said retrieved supplemental digital content such that supplemental digital content retrieved for a respective message in said set of messages is included within said respective message.

5. The method of claim 4, wherein said modified messages in said message set are displayed upon opening said message conversation.

6. The method of claim 1, wherein said follow criteria comprises a type of data consisting of: an email address, a content item, a subject, a recipient, a sender, a timing of a message, and a type of action causing the incoming message to be received.

7. The method of claim 1, wherein said follow section is a separate inbox view dedicated solely to followed conversations that are associated with said inbox.

8. The method of claim 1, further comprising:
   extracting at least said portion from said message; and
   generating a snippet based on said extracted portion.

9. The method of claim 8, further comprising:
   delivering said snippet to said inbox for display within said follow section.

10. The method of claim 9, wherein said delivered snippet is displayed along with said retrieved supplemental digital content.

11. A non-transitory computer-readable storage medium tangibly encoded with computer-executable instructions, that when executed by a server, perform a method comprising:
    receiving, at the server, an instruction to follow a message conversation and each update of the conversation from a message inbox of a user, said follow instruction comprising follow criteria associated with a message context of the conversation;
    analyzing, via the server, message data associated with an incoming message addressed to the user, said analysis comprising comparing said message data to said follow criteria;
    determining, via the server, whether at least a portion of said message data satisfies said follow criteria based on said comparison;
    upon determining that at least said portion satisfies said follow criteria, retrieving, via the server, supplemental digital content corresponding to said message context and said message data;
    modifying, via the server, said incoming message based on said retrieved supplemental digital content such that said supplemental digital content is included within said modified message; and
    delivering, via the server, said modified message for display in said inbox in association with said message conversation, said delivery facilitates display of said modified message in a follow section of said inbox.

12. The non-transitory computer-readable storage medium of claim 11, further comprising:
    modifying each of the messages in said message conversation to include said supplemental digital content.

13. The non-transitory computer-readable storage medium of claim 11, further comprising:
    determining an attribute of the message data;
    retrieving an updated version of the supplemental content; and
    updating said modified message to replace said supplemental content with said updated version.

14. The non-transitory computer-readable storage medium of claim 11, further comprising:
    analyzing message data associated with each message in said message conversation, said analysis comprising comparing said message data to said follow criteria;
    identifying a set of messages from within said message conversation that has corresponding message data satisfying said follow criteria;
    retrieving supplemental digital content corresponding to each message in said set of messages;
    modifying each message based on said retrieved supplemental digital content such that supplemental digital content retrieved for a respective message in said set of messages is included within said respective message.

15. The non-transitory computer-readable storage medium of claim 14, wherein said modified messages in said message set are displayed upon opening said message conversation.

16. The non-transitory computer-readable storage medium of claim 11, wherein said follow criteria comprises a type of data consisting of: an email address, a content item, a subject, a recipient, a sender, a timing of a message, and a type of action causing the incoming message to be received.

17. The non-transitory computer-readable storage medium of claim 11, wherein said follow section is a separate inbox view dedicated solely to followed conversations that are associated with said inbox.

18. The non-transitory computer-readable storage medium of claim 11, further comprising:
    extracting at least said portion from said message;
    generating a snippet based on said extracted portion; and
    delivering said snippet to said inbox for display within said follow section, wherein said delivered snippet is displayed along with said retrieved supplemental digital content.

19. A server comprising:
    a processor; and
    a non-transitory computer-readable storage medium for tangibly storing thereon program logic for execution by the processor, the program logic comprising:
        logic executed by the processor for receiving, at the server, an instruction to follow a message conversation and each update of the conversation from a message inbox of a user, said follow instruction comprising follow criteria associated with a message context of the conversation;
        logic executed by the processor for analyzing, via the server, message data associated with an incoming message addressed to the user, said analysis comprising comparing said message data to said follow criteria;
        logic executed by the processor for determining, via the server, whether at least a portion of said message data satisfies said follow criteria based on said comparison;
        logic executed by the processor for retrieving, via the server, upon determining that at least said portion satisfies said follow criteria, supplemental digital content corresponding to said message context and said message data;
        logic executed by the processor for modifying, via the server, said incoming message based on said retrieved supplemental digital content such that said supplemental digital content is included within said modified message; and
        logic executed by the processor for delivering, via the server, said modified message for display in said inbox in association with said message conversation, said delivery facilitates display of said modified message in a follow section of said inbox.

20. The server of claim 19, further comprising:
    logic executed by the processor for modifying each of the messages in said message conversation to include said supplemental digital content.

* * * * *